United States Patent Office 2,912,740
Patented Nov. 17, 1959

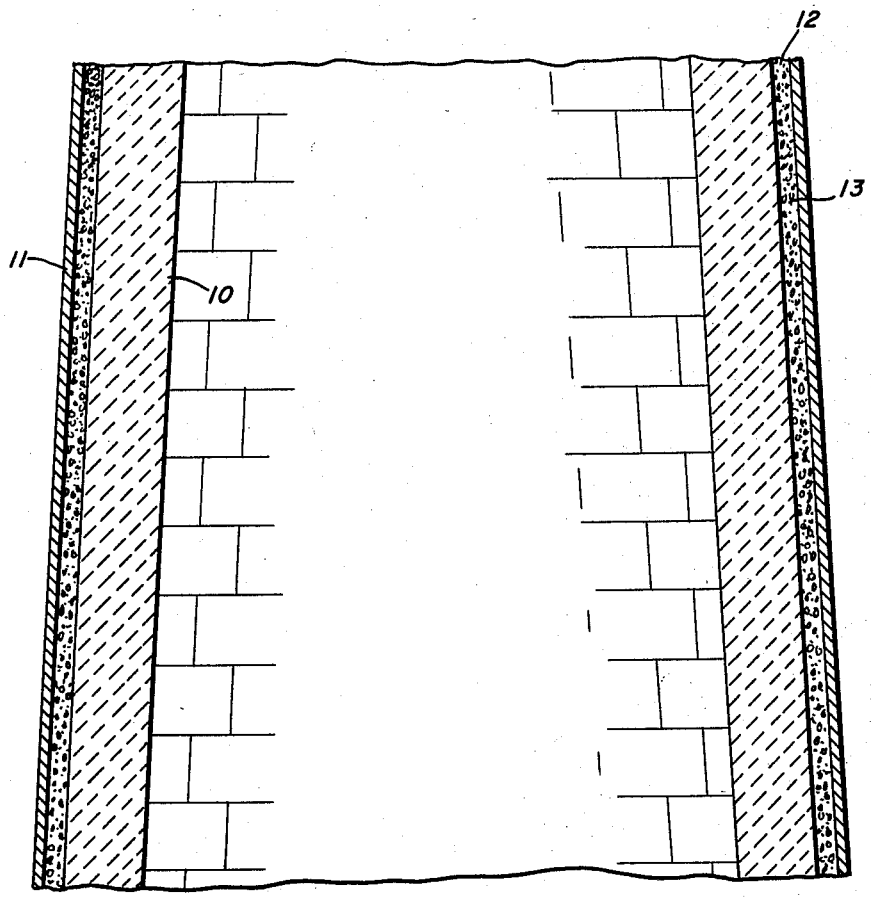

2,912,740

METHOD OF RETARDING DISINTEGRATION OF BLAST-FURNACE LINING

Thomas F. Berry, Union City, N.J., assignor to United States Steel Corporation, a corporation of New Jersey Application April 9, 1958, Serial No. 727,492

2 Claims. (Cl. 25—155.5)

This invention relates to a method of preserving refractory brick such as used in constructing the linings of blast-furnaces, from the destructive effect of the deposition of carbon therein as a result of the catalytic dissociation of carbon monoxide in the presence of the iron-oxide contaminant in the fire-clay of which the bricks are composed.

This is a continuation-in-part of my application Serial No. 558,410, filed January 11, 1956, now abandoned.

The disintegration of fire-clay brick caused by carbon deposition, is a limiting factor on the length of a furnace campaign. Much effort has been exerted in attempts to find a medium to prevent or delay such disintegration but no fully satisfactory solution for the problem has yet been found. Some such media are effective for a limited time only but adversely affect the fire-clay mortar used for building up the lining.

My invention comprises the addition of sulphur or a sulphur-bearing material to the packing, i.e., the granular material used to fill the space between the steel shell of the furnace and the exterior of the lining laid therein. As the sulphur-bearing material, I prefer to use high-sulphur coke.

The drawing is a diagrammatic partial vertical section through a blast-furnace stack, showing the manner of employing the invention.

In carrying out the invention, blast-furnace lining brick 10 are laid in successive courses around the interior of the furnace shell 11 using as mortar a thin slurry of fire clay, and leaving a small space 12 between the lining and shell.

I mix sulphur or sulphur-bearing materials with the packing 13, i.e., the granular material used to fill space 12. The packing is usually clay, vermiculite, grog, crushed slag or a mixture thereof, all refractory materials. In accordance with my invention, I add to such material from 15 to 50% by weight of high-sulphur coke, preferably about 35%, or a mixture of 98% coke and 2% sulphur. In either case, the sulphur content of the packing exerts a poisoning effect on the catalytic action of the iron compounds in the fire brick, relative to the carbon monoxide of the furnace atmosphere. The poisoning effect is long-lasting, hence disintegration of lining brick by carbon deposition is obviated as a limit on the length of the furnace campaign.

The advantages of my invention are the low cost and ease of applying the preservative medium and the long life thereof, exceeding the normal furnace campaign. The latter results from the fact that the sulphur is given off slowly over a long period of time.

Although I have disclosed herein the preferred practice of my invention, I intend to cover as well any change or modification therein which may be made without departing from the spirit and scope of the invention.

I claim:

1. A method of constructing a blast-furnace lining resistant to carbon disintegration which consists in laying a fire-brick lining in a furnace shell, leaving a space between the lining and shell, and placing in said space a solid, granular sulphur-bearing material.

2. A method of constructing a blast-furnace lining resistant to carbon disintegration which consists in laying a fire-brick lining in a furnace shell, leaving a space between the lining and shell, mixing sulphur-bearing material with thermally insulating granular packing material and filling said space with the resulting mixture.

References Cited in the file of this patent

UNITED STATES PATENTS

| | | |
|---|---|---|
| 1,940,277 | Streasau | Dec. 19, 1933 |
| 1,982,490 | Williams et al. | Nov. 27, 1934 |
| 2,724,887 | Shea | Nov. 29, 1955 |
| 2,725,225 | Shea | Nov. 29, 1955 |
| 2,725,226 | Shea | Nov. 29, 1955 |
| 2,725,227 | Shea | Nov. 29, 1955 |